United States Patent [19]
Stuker et al.

[11] Patent Number: 5,794,965
[45] Date of Patent: *Aug. 18, 1998

[54] STABILIZER LINK

[75] Inventors: Robert W. Stuker, Bollingbrook; Frederick Winkler, Morton Grove, both of Ill.

[73] Assignee: Mohawk Manufacturing & Supply Co., Inc., Niles, Ill.

[*] Notice: The term of this patent shall not extend beyond the expiration date of Pat. No. 5,707,073.

[21] Appl. No.: 708,356

[22] Filed: Sep. 4, 1996

Related U.S. Application Data

[60] Provisional application No. 60/000,477 Jun. 23, 1995.
[63] Continuation-in-part of Ser. No. 503,427, Jul. 17, 1995.
[51] Int. Cl.$^6$ ..................................... B60G 21/00
[52] U.S. Cl. .................... 280/665; 280/689; 280/717
[58] Field of Search .................... 280/665, 689, 280/717, 664, 725, 679, 695, 700, 721, 726

[56] References Cited

U.S. PATENT DOCUMENTS

| | | | |
|---|---|---|---|
| 4,690,234 | 9/1987 | Takada | 280/665 X |
| 4,875,703 | 10/1989 | Murakami | 280/665 |
| 4,944,523 | 7/1990 | Hardy, Jr. | 280/689 |
| 5,062,656 | 11/1991 | Hynds et al. | 280/689 |
| 5,064,216 | 11/1991 | Hynds | 280/689 |
| 5,076,605 | 12/1991 | Umeda | 280/689 |
| 5,368,326 | 11/1994 | Turck et al. | 280/689 |
| 5,380,036 | 1/1995 | Perkins et al. | 280/716 |
| 5,551,722 | 9/1996 | Schwartz et al. | 280/689 |

FOREIGN PATENT DOCUMENTS

| | | | |
|---|---|---|---|
| 3028014 | 2/1991 | Japan | 280/689 |

*Primary Examiner*—Christopher P. Ellis
*Attorney, Agent, or Firm*—Olson & Hierl, Ltd.

[57] ABSTRACT

A stabilizer link for a steering and suspension assembly for a bus or other vehicle comprising a pair of shafts and a housing that is defined by a pair of cylinders that are joined together by a rod or stem. Each cylinder defines a pair of contiguous tapered bores opening in opposite directions for receiving one of the shafts. Each shaft is secured to the housing by replaceable components, namely, a pair of retainers, a pair of bushings, and a fastener secured to the other threaded end of the shaft. Each pair of bushings is matingly received within bores.

51 Claims, 6 Drawing Sheets

STABILIZER LINK

This application is a continuation-in-part of U.S. patent application Ser. No. 08/503,427, filed on Jul. 17, 1995, which claims the priority of provisional U.S. patent application Ser. No. 60/000,477, filed on Jun. 23, 1995.

TECHNICAL FIELD OF THE INVENTION

The present invention relates to a stabilizer or torsion bar link that can be used to stabilize the suspension for a vehicle, such as, for example, a bus or a car.

BACKGROUND OF THE INVENTION

A suspension assembly for a bus or other vehicle usually includes, among other components, a torsion bar and a connecting or stabilizer link. The torsion bar (which also may be called a stabilizer or sway bar) is generally affixed to the vehicle frame with the stabilizer link functioning as the connecting member to the axle. The torsion bar absorbs torsional loading while the stabilizer link additionally must act as a shock absorber.

The stabilizer link can have a generally U-shaped construction that includes a metal housing and a pair of metal shafts permanently secured to the housing. The shafts are also connected to other components of the assembly, such as the axle plate (or associated part) and the torsion bar.

It is known to use rubber as an intermediary to permanently secure the shafts to the housing to add flexibility to the link so that the stabilizer link is better able to absorb road shocks. To construct such a link, rubber is molded to one end of each shaft. The ends of the shaft are then inserted into the bores defined in the housing. The housing is crimped radially around each bore to permanently secure the shafts to the housing.

A disadvantage of this known stabilizer link, however, is that it has a relatively short life expectancy because the rubber tends to shear or become worn relatively quickly and much sooner than the rest of the components. Thus, once the rubber shears or becomes worn, the entire stabilizer link is no longer useful and must be replaced.

In an attempt to provide a more durable stabilizer link, an all metal stabilizer link that uses all metal ball studs has been developed. This stabilizer link is undesirable because it lacks flexibility and does not absorb road shocks as well as the other link. In addition, it has been noted as the source of suspension squeek. As a result, the all metal link tends to transfer stress to the suspension which, over time, will shorten the life of various parts in the suspension.

What is needed is a stabilizer link that is capable of effectively absorbing road shocks better than the prior art stabilizer links, and that is more economical than the prior art stabilizer links. Such a link should include a flexible element to absorb the shocks, but should also address the problem of short life expectancy associated with the known link having a flexible element. Such a link preferably is easy to assemble. The present invention meets these desires.

SUMMARY OF THE INVENTION

The present invention provides a stabilizer link for a steering and suspension assembly for a bus or other vehicle. In its preferred embodiment, it includes a pair of shafts or studs, and a housing that is defined by a pair of eyes or cylinders that are joined together by a rod or stem. Each cylinder defines a pair of adjoining or contiguous, tapered bores opening in opposite directions for receiving a pair of bushings.

Preferably, both ends of each shaft are threaded, with a distal threaded end of each shaft being secured to another component of the assembly such as the axle plate (or associated part) or torsion bar. Each shaft may be readily secured to the housing by replaceable components, such as, a pair of proximal and distal retainers, a pair of bushings, and a fastener such as a nut secured to a proximal threaded end of the shaft. In one preferred embodiment, the proximal and distal retainers are in the form of proximal and distal retaining washers. In an alternative preferred embodiment, each proximal retainer is in the form of a proximal ring that is integral or unitary with its corresponding fastener, and each distal retainer is in the form of a distal ring that is integral or unitary with its corresponding shaft.

The bushings preferably are constructed of polyurethane, which has a longer life expectancy than rubber or synthetic rubber and has better shock absorbing dynamics. Polyurethane also has a relatively high degree of elasticity. Preferably, the polyurethane has a hardness of about 85 to about 95 durometers on the Shore A scale, and optimally about 90 durometers. Alternatively, the bushings may be constructed of rubber or synthetic rubber that preferably has a hardness of about 70 durometers.

Each pair of bushings is received within one of the respective pairs of bores defined by the cylinders. Desirably, each bushing has a first frustoconical wall with a taper that narrows toward the end of the bushing. The first frustoconical outer walls preferably complement the tapered bores. This construction eliminates or reduces lateral displacement of the housing relative to the bushings and shaft. The tapers also eliminate or reduce longitudinal displacement of each bushing in the direction of its adjacent bushing.

Each bushing may also have a second frustoconical outer wall with a taper that narrows toward the other end of the bushing, which extends outside the bore. This construction tends to relieve pressure and avoid pinching of the bushing between the washers and the cylinders when the bushing is under compression during service.

Preferably, the retainers are disposed about the shafts, and abut the ends of the bushings that extend outside the bores. If retaining washers are employed, the holes defined by the proximal and distal retaining washers preferably are different sizes.

Each retainer may have a circumferential flange angled with respect to a flat portion. The flanges of each pair of proximal and distal retainers face away from the bushings, which also helps to relieve pressure when the bushing is under compression yet still contain the bushings in the housings. With this construction, when the shaft is deflected from center, it causes further compression of the bushings. The orientation of the retainers allows relief from this compression. The flanges also provide a surface for the bushing to "roll" against.

The fasteners may be conventional castle nuts or may otherwise be adapted to engage a cotter pin for securing the fasteners. With this embodiment, one of the threaded ends of the shaft also defines a cotter pin hole for receiving the cotter pin. This construction tends to be more reliable against shock and vibration than other alternatives, and also avoids causing damage to the threads of the shafts. Alternatively, however, a nylon insert nut or an all metal lock nut can be used.

The preferred embodiment of the present invention provides a stabilizer link that is more economical than the prior art links because its components can be easily and quickly replaced when they fail or become worn. As a result, the link can be reused and does not have to be discarded when one of its components fails or becomes worn.

In this regard, cost savings likely will be appreciated most in connection with the replacement of bushings since they tend to have substantially shorter lives than the rest of the components of the stabilizer link and also tend to be significantly less expensive than the housing and shafts. Thus, with the present invention, the bushings can be continuously replaced as they become worn, thereby substantially extending the life of the stabilizer link.

If desired, the stabilizer link may be sold together as a fully-assembled link. Alternatively, all of the components may be sold together (e.g. the housing, retainers, bushings, fasteners and pins) in a container such as a box or bag as a kit, if desired. The components can then be assembled and installed on a vehicle. Thereafter, when the bushings (or other components) become worn, new bushings (or other components) can be obtained separately from the kit, and then can be replaced.

Similarly, the components that tend to be replaced more frequently can also be sold together as a kit. For example, two pairs of bushings, two pairs of retainers, a pair of fasteners and a pair of cotter pins may be sold together in a package to be used when any or all of these original (or previously replaced) components become worn. In an alternative embodiment described above, the kit may include two pairs of bushings, the pair of fasteners each with unitary proximal retainers, and a pair of cotter pins. Such a kit enables quick and easy replacement of the corresponding components.

Numerous other advantages and features of the present invention will become readily apparent from the following detailed description of the invention and the embodiments thereof, from the claims and from the accompanying drawings.

DETAILED DESCRIPTION OF THE INVENTION

As illustrated in FIGS. 1–5, the stabilizer link 10 in accordance with the invention includes a pair of hollow cylinders or eyes 12. Each cylinder 12 defines a pair of connected or contiguous, tapered bores 14 opening in opposite directions along a common axis to define respective open ends 15. The cylinders 12 are joined by a stem or a rod 16 so that the axes of the pairs of bores 14 are substantially parallel. Two bushing configurations preferably in the form of two pairs of bushings 18 are also included, and each pair is matingly received into a respective pair of bores 14. Each bushing 18 defines a cylindrical aperture or channel 20 along its axis.

The stabilizer link 10 also includes two shafts 22, each of which is received into the respective pair of bores 14 defined by the cylinder 12 and the channels 20 defined by the respective pair of bushings 18. Means for retaining the shafts 22 within the bores 14 and channels 20 are also included.

Figure 1:
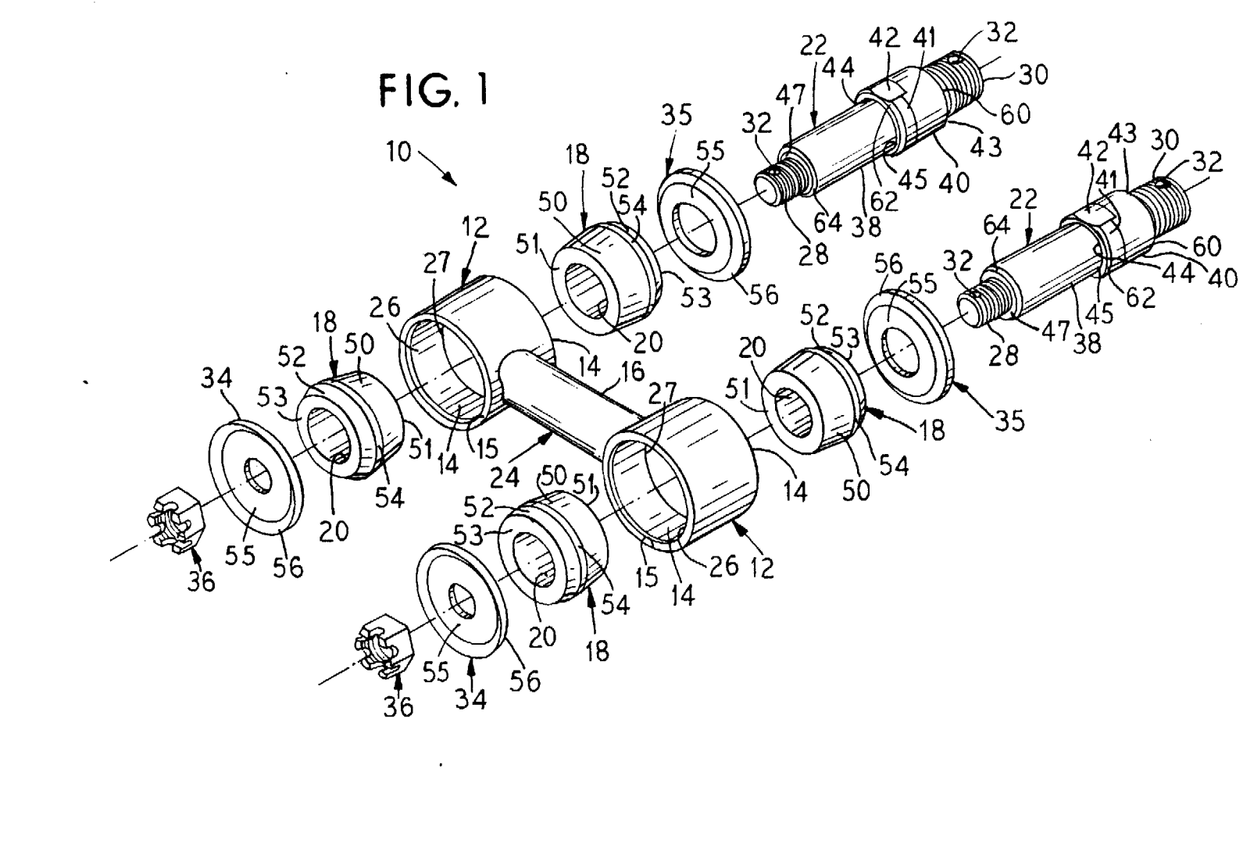
FIG. 1 is an exploded perspective view of a stabilizer link in accordance with one embodiment of the invention.

The cylinders 12 and stem 16 together define a housing 24 that may be a one-piece housing made from a molded polymer or metal (see, e.g., FIG. 1). Alternatively, the housing 24 may be a three-piece steel weldment wherein the cylinders 12 are welded to the stem 16 (see, e.g., FIGS. 2–4). In this alternative construction, the cylinders 12 may, for example, be a Monroe Shock Stock No. 11963. The stem 16 preferably has a circular cross section substantially along its length.

Figure 5:
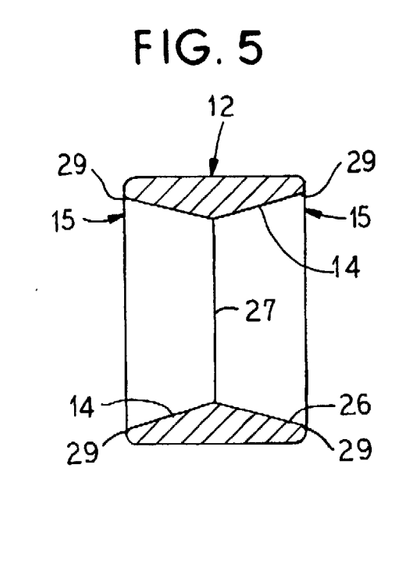
FIG. 5 is a cross section view taken along the lines 5—5 of FIG. 4.

Each cylinder includes an inner wall 26 that defines one of the pairs of bores 14 and a central ridge 27 that divides the bores 14. The ridge 27 may define a flat face that extends parallel to the axis of the bores, or may have a rounded face. The inner walls 26 of each cylinder 12 adjacent each end 29 of the cylinder may be rounded (FIG. 5).

Figure 2:
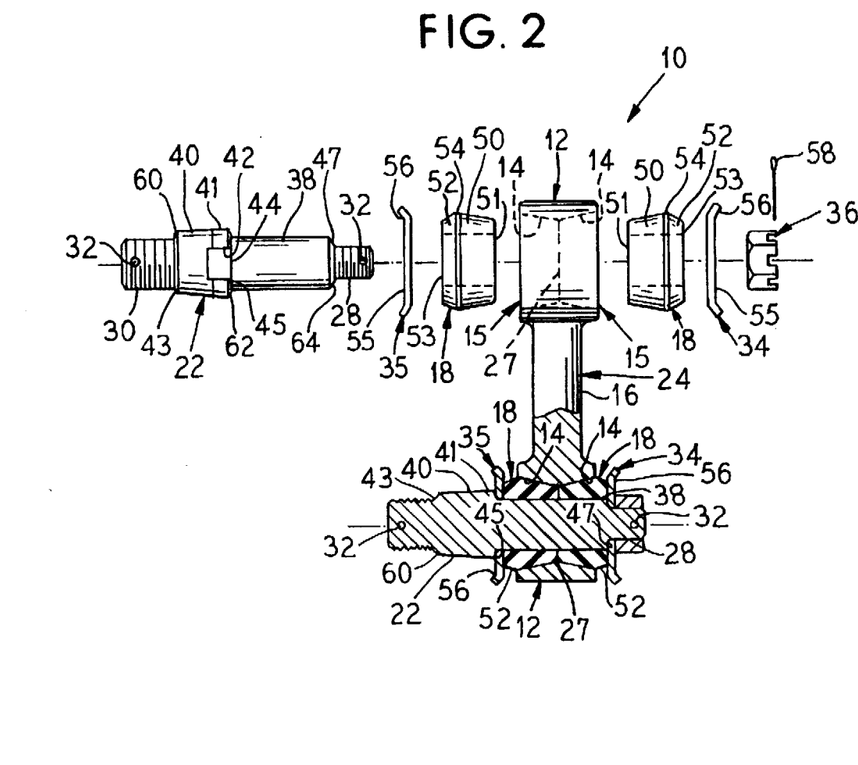
FIG. 2 is a partial exploded and partial cross section view of a stabilizer link similar to the link of FIG. 1.
Figure 3:
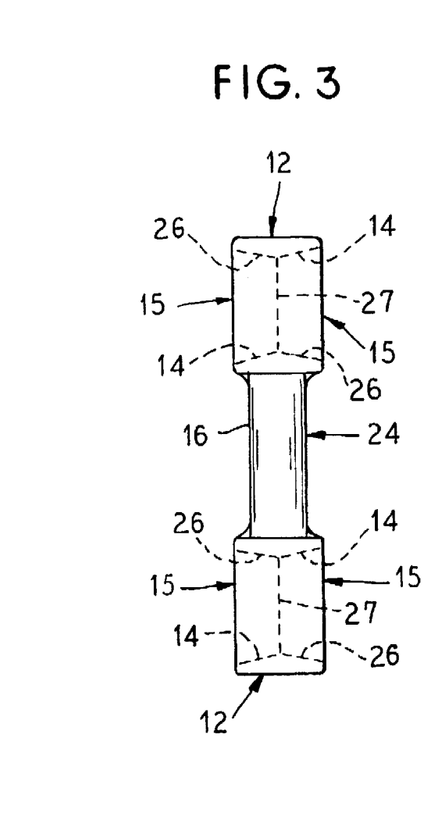
FIG. 3 is a plan view of the side of the housing of the stabilizer link of FIG. 2, illustrating with dotted lines the inner walls of the cylinders.
Figure 4:
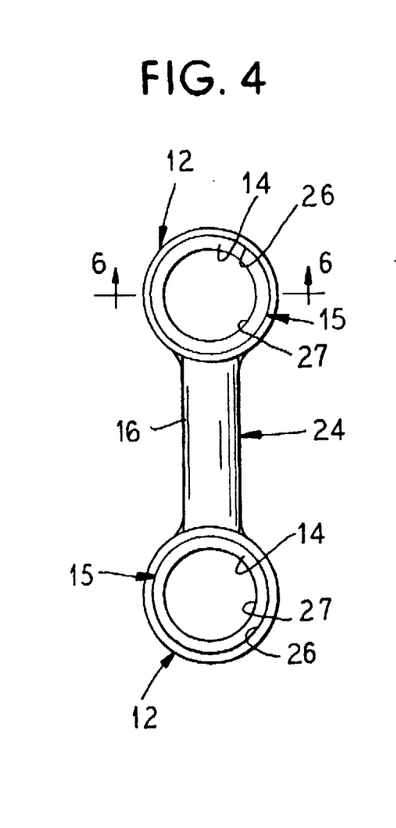
FIG. 4 is a plan view of the top of the housing of FIG. 3.

Preferably, each shaft 22 defines a proximal end 28 and a distal end 30, both of which are threaded and include cotter pin holes 32. The distal ends 30 of shafts 22 are secured to another component of the steering and suspension assembly. For example, the distal end 30 of one shaft 22 may be secured to the axle plate (or associated part) and the distal end of the other shaft may be secured to the stabilizer bar. The cotter pin hole 32 on the distal end 30 of the threaded shaft 22 may be used to secure a fastening nut that is used to attach the shaft to the assembly component. The diameter of the distal end 30 may be greater than the diameter of the proximal end 28.

In the embodiments of FIGS. 1–5, the means for retaining each shaft 22 within the bores 14 includes one of the pairs of bushings 18, a pair of retainers that may be in the form of retaining washers, namely a proximal washer 34 and a distal washer 35, and a fastener such as nut 36 secured to the threaded proximal end of the shaft.

Each shaft 22 includes a bushing portion 38 adjacent the proximal end 28, a tapered portion 40 adjacent the distal end 30, and a central portion 41 joining the bushing portion and the tapered portion. One of the pairs of bushings 18 and one of the distal washers 35 is disposed about the bushing portion 38 of each shaft. The diameter of the bushing portion corresponds to the diameters of the channels 20 of the bushings 18 and the distal washer 35, and is less than the diameters of the tapered and central portions 40, 41.

The tapered portion 40 of the shaft 22 defines a gradual inward tapering in the direction of the distal end 30 of the shaft 22 for engaging mating surfaces on the components of the steering and suspension assembly. The central portion 41 defines a first lateral face 43 adjacent the distal end 30 and a second lateral face 45 adjacent the bushing portion 38. The bushing portion defines a third lateral face 47 adjacent the proximal end 28. The shaft 22 may be constructed of any suitable metal such as a steel with an elevated hardness commonly known as "Stressproof", or of any other suitable material.

Each shaft 22 may also include a pair of diametrically-opposed wrench flats 42 to be used to tighten the nuts 36. In the illustrated embodiments, the wrench flats are formed on the central portion 41, extending onto the tapered portion 40. Alternatively, alternate "drive" methods could be used, such as, for example, a hex socket broached or forged into the end of the stud. In addition, a radius corner portion 44 may be formed at the distal end of the bushing portion 41 adjacent the lateral face 45 for reducing the stress that tends to cause the formation of fractures. Tapered or broken corner portions 60, 62 and 64 may be defined on the periphery of respective lateral faces 43, 45 and 47 to eliminate sharp edges.

The bushings 18 desirably are substantially the same in configuration and material. In the preferred embodiment, the bushings 18 are constructed of polyurethane, which has a longer life expectancy than rubber or synthetic rubber and has better shock absorbing dynamics. Polyurethane also has a relatively high degree of elasticity. Preferably, the polyurethane has a hardness of about 85 to about 95, and optimally about 90 durometers on the Shore A scale. The bushings 18 may, for example, be polyurethane bushings that are available from Gabriel as part No. #415025, or a standard polyurethane bushings that can be obtained from Euclid.

Each bushing 18 includes a pair of flat ends 51, 53 that extend substantially perpendicular to the axes of the bores, and first and second frustoconical outer bushing walls 50, 52 that are joined together by a neck 54. The flat ends 53 of each pair of bushings 18 are in abutting engagement within a respective cylinder 12. The outer diameters of the flat ends 51, 53 are substantially the same.

The first outer bushing wall 50 is received substantially within its respective bore 14, and the second outer bushing wall 52 extends at least partially beyond its respective bore 14. Desirably, the first outer bushing wall 50 extends most of the length of the bushing 18, is tapered inwardly towards the proximal end of the bushing, and has a more gradual taper than the second outer bushing wall 52. The neck 54 may be inwardly tapered toward the first outer bushing wall, and its length is substantially less than the second outer bushing wall 52. The first outer bushing walls 50 complement the tapered bores 14. This construction eliminates or reduces lateral displacement of the housing 24 relative to the bushings 18. It also eliminates or reduces the longitudinal movement of each bushing 18 in the proximal direction.

Despite the advantages of the polyurethane bushing, it is appreciated that the bushings 18 can instead be constructed of any other suitable material, such as rubber or synthetic rubber. Preferably, the material chosen has a relatively long life expectancy. In this regard, some important characteristics to consider in choosing a suitable material are its ability to withstand adverse weather condition and its ability to resist water, oil and ozone.

It is noted that natural and most synthetic rubbers have their best mechanical characteristics (tensile strength, elongation, compression set, etc.) when produced at a 70 durometer. Typically, the rubber is then compressed to get the hardness needed to withstand the shock loads. Polyurethane bushings, on the other hand, generally do not need the same degree of compression because of the increased hardness of polyurethane.

In the embodiments of FIGS. 1-5, each pair of proximal and distal retaining washers 34, 35 is disposed about one of the shafts 22. Each washer 34, 35 has an outer diameter substantially the same as or slightly less than the outer diameter of the cylinders 12. Each distal washer 35 is disposed about one of the respective bushing portions 38, and is disposed between and in abutting engagement with the flat end 53 of one of the bushings 18 and the lateral face 45 of one of the shafts 22. The inner diameter of the distal washers 35 complements the diameter of the bushing portion 38 and radius corner portion 44.

The proximal washer 34 is disposed about the proximal end 28 of one of the respective shafts 22, and is disposed between and in abutting engagement with another bushing 18 and one of the nuts 36. The inner diameter of the proximal washer 34 complements the diameter of the radius corner portion 44 of the shaft 22. The inner diameter of the proximal washer 34 is less than the inner diameter of the distal washer 34.

Desirably, each washer 34, 35 includes a flat portion 55 and a circumferential flange 56 angled with respect to the flat portion to form a dish shape, and the flanges extend in opposite directions away from the respective pair of bushings 18. The flanges preferably extend at an angle of about 15 degrees to about 45 degrees and optimally at about 30 degrees. The outer diameter of the flat portion 55 is about the same as the outer diameters of the flat ends 51, 53 of the bushings 18. The thicknesses of the proximal and distal washers 34, 35 may be substantially the same.

Preferably, prior to assembly, the length of the bushing portion 38 of the shaft 22 is less than the dimension defined by the length of one of the pairs of bushings 18 plus the thickness of the flat portion 55 of the distal washer 35. During assembly, however, the bushings are compressed so that, in the assembled link, the length of the bushing portion 38 of the shaft 22 is about the same as the dimension defined by the length of one of the pairs of bushings 18 plus the thickness of the flat portion 55 of the distal washers 35.

The flanges 56, the inward tapering of the second outer bushing walls 52 of the bushings 18, and the rounded off inner walls 26 of the cylinders 12 tend to relieve pressure on the bushings when they are under compression, which can occur when the shaft 22 is deflected off center from absorbing road shocks. This construction provides an area in which the bushing can expand while under pressure. It also reduces the likelihood of any "pinching" of the bushings 18 between the washers and cylinders 12. The dish-shaped retaining washers 34, 35 also provides a surface for the bushing to "roll" against.

The nuts 36 may be conventional nuts but, preferably are conventional castle nuts adapted to receive a cotter pin 58 used to secure the nuts (see FIG. 2). The cotter pin 58 also extends through one of the cotter pin holes 32 formed on the shafts 22. Generally, application of about 55 to about 70 foot-pounds of torque will sufficiently secure the nuts to the assembly. An advantage of this construction is that it is more reliable against shock and vibration than other alternate means of securing the nut 36 to the shaft 22. Also, this construction avoids damaging the threads of the shafts 22. Alternatively, however, a nylon insert or an all metal lock nut can be used.

Examples of dimensions and materials useful for making the present invention are disclosed in detail in provisional U.S. patent application Ser. No. 60/000,477 filed Jun. 23, 1995 for which priority is claimed. That entire disclosure is incorporated by reference. Those of ordinary skill in the art will recognize that various dimensions and materials can be used depending on the exact use of the present invention.

One of the advantages of the stabilizer link 10 in accordance with the present invention relates to the replaceability of the individual components, such as the bushings 18 which tend to have shorter life than the remaining components of the stabilizer bar. When the bushings 18 are no longer useful due to wear and tear (or any other reason), they can be replaced quickly and easily. Because the rest of the components can still be used, this results in cost savings each time the bushings are replaced.

If desired, all the components may be sold together (e.g., the housing 24, shafts 22, bushings 18, retaining washers 34, 35, nuts 36 and pins 58) in a container such as a box or bag as a kit, if desired. The components can then be assembled and installed on a vehicle. Thereafter, when the bushings 18 become worn, new bushings can be obtained separately from the kit, and then can be replaced in accordance with the above. It is appreciated that other components may be individually replaced.

Additionally, some of the components which may need to be replaced on a more frequent basis may be sold together in a container such as a box or bag as a kit, if desired. When the corresponding components on the link 10 become worn, the kit can be used to replace the worn components.

For example, two pairs of bushings 18 and two pairs of proximal and distal retaining washers 34, 35 may be sold together as a kit for replacement of the corresponding components on the link 10. Such a kit enables the quick and easy replacement of the corresponding components. The bushings, for example, have the same configuration and are constructed of the same materials, and, thus, they can be installed quickly and easily since virtually no time is spent determining where each individual bushing goes. Since the proximal and distal washers 34, 35 have different inner diameters which correspond to the portions of the shaft on which they are to be installed, they also can be installed relatively quickly.

If desired, the kit may also include one pair of nuts 36 to avoid having to reuse nuts that may be difficult to re-install due to corrosion or wear and tear. If the nuts are castle nuts, a pair of cotter pins may also be included as part of the kit to enhance the quick and easy replacement of the castle nuts.

FIGS. 6–10 illustrate an alternative embodiment of the stabilizer link 210 wherein the proximal retainer is unitary, and preferably integral, with its corresponding fastener; and the distal retainer is unitary, and preferably integral, with its corresponding shaft. As used herein, the term "integral" is intended to refer to a single structure that has a one-piece or monolithic-type construction; and the term "unitary" is intended to refer to a structure comprised of components that are fixedly connected or mounted together in any suitable manner, including being integral.

The embodiment of FIGS. 6–10 further facilitates quick and easy assembly of the stabilizer link and the ready replacement of various components because each proximal retainer and corresponding fastener are not separately assembled on the shaft and because the distal retainers do not have to be assembled on the shafts.

With this embodiment, a pair of fasteners 270, engageable with the proximal ends 228 of the shafts 222, are defined. The proximal retainer preferably is in the form of a lip or ring 271 having first and second sides 272 and 273. Each ring 271 is unitary with the respective fastener 270. The first side 272 of each ring 271 defines a generally circular and generally flat portion or face 274 facing or abutting the flat end 253 of one of the bushings 218. The outer diameter of the ring 271 is substantially the same as or slightly less than the outer diameter of the cylinders 212.

The circular flange 256 preferably is in the form of a beveled edge that extends around a periphery of the face 274, preferably extending away from the bushing 218 to relieve pressure on the bushings when they are under compression. The circular flange 256 may extend at an angle of about 15 degrees to about 45 degrees, and optimally at about 30 degrees.

Figure 8:
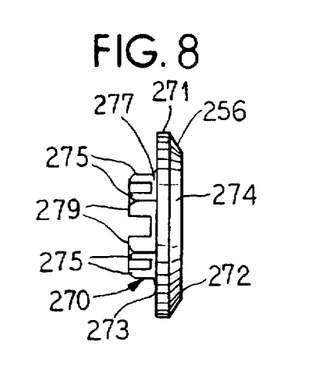
FIG. 8 is a side elevational view of an integral fastener and proximal retainer of the stabilizer link of FIG. 6.
Figure 9:
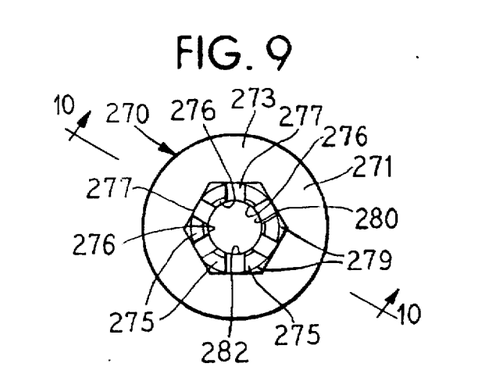
FIG. 9 is a top view of the fastener and proximal retainer of FIG. 8.
Figure 10:
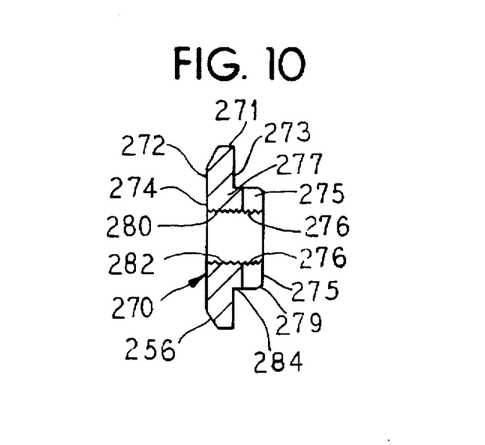
FIG. 10 is a cross-sectional view taken along the lines 10—10 of FIG. 9.

Each fastener 270 includes a plurality of parallel engaging fingers 275, preferably six, extending from the second side 273 of each ring 271. Each engaging finger 275 defines an inwardly-facing wall 276. The engaging fingers 275 on each ring 271 may be interconnected at their bases by an apron 277. In the illustrated embodiment, each engaging finger 275 has a generally pentagonal cross section, and the top of each finger includes a tapered outer portion 279.

A hole 280 for receiving the threaded proximal end 228 of one of the shafts 222 is defined in each fastener 270 preferably by an inner wall 282 and the inwardly-facing walls 276. Preferably, both the inner wall 282 and the inwardly-facing walls 276 are threaded for engaging the threaded proximal end 228 of the shaft 222. The engaging fingers 275 may be configured to receive one of the cotter pins 258 to secure the fasteners 270 to the shafts 222. The engaging fingers 275 may also include a radiused corner portion 284 defined adjacent the second sides 206 of the ring 202.

Figure 6:
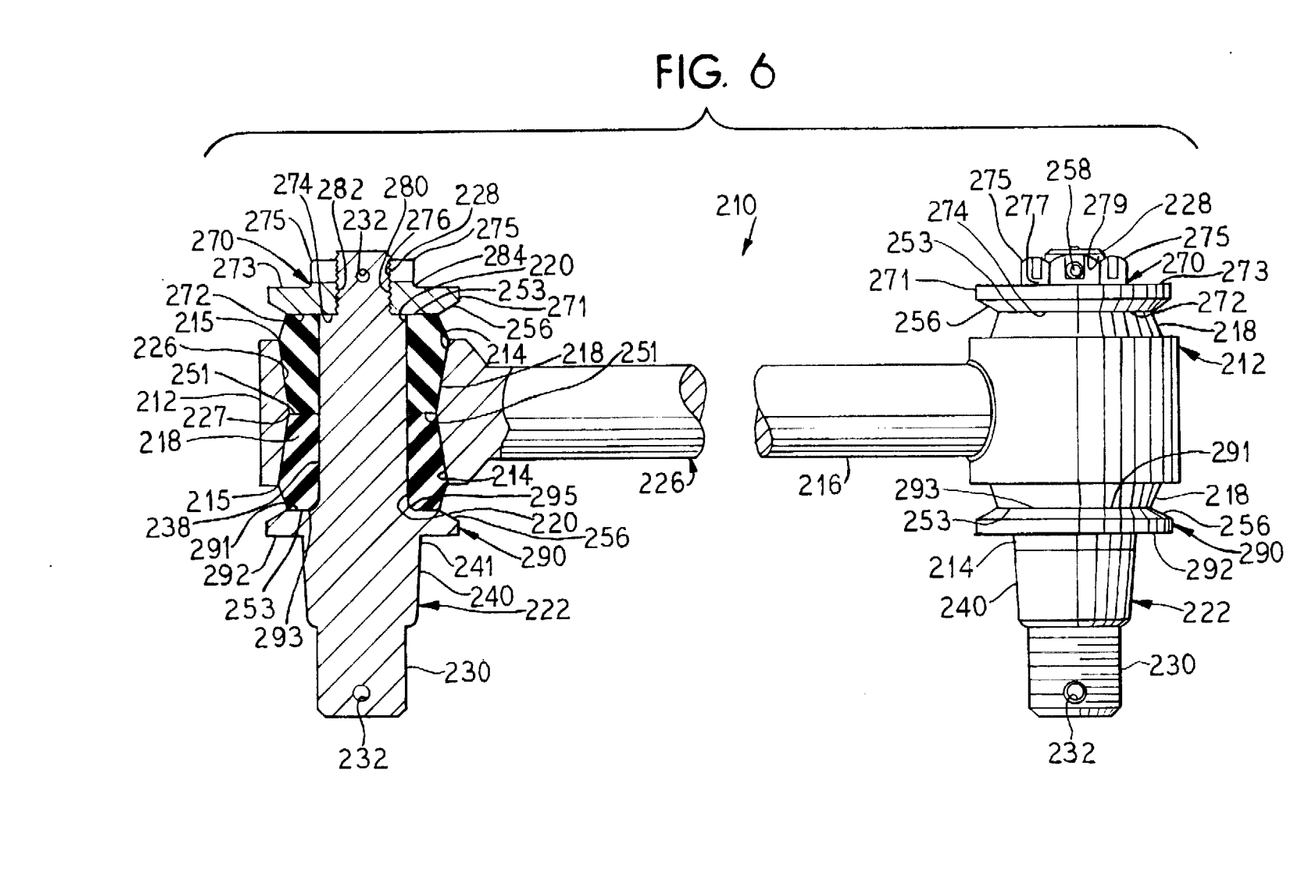
FIG. 6 is a broken and partial cross section view of a stabilizer link in accordance with a further alternative embodiment of the invention.
Figure 7:
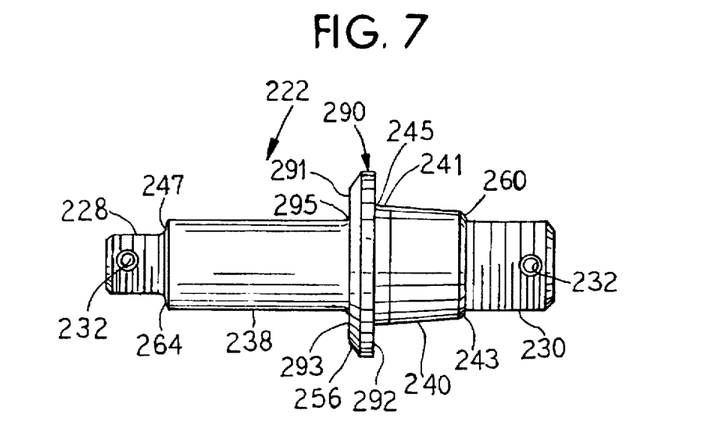
FIG. 7 is a side elevational view of the shaft of the stabilizer link of FIG. 6.

The pair of distal retainers are defined by a pair of lips or rings 290, each of which is unitary with the respective shaft 222 proximal of the distal end 230 of the shaft 222. Each ring 290 defines first and second sides 291 and 292. The first side 291 of each ring 290 defines a generally circular and generally flat portion or face 293 facing or abutting the flat end 253 of one of the bushings 218. The ring 290 has an outer diameter substantially the same as or slightly less than the outer diameter of the cylinders 212.

The circular flange 256 on the ring 290 preferably is in the form of a beveled edge that extends around a periphery of the face 293, preferably extending away from the bushing 218 to relieve pressure. The circular flange may extend at an angle of about 15 degrees to about 45 degrees and optimally at about 30 degrees.

Each ring 271 and the corresponding fastener 270 are unitary, and thus they may be integral as shown in the embodiment of FIGS. 6–10 or fixedly connected or mounted together in any other suitable manner. Similarly, each ring 290 and the corresponding shaft 222 are unitary, and thus they may be integral as shown in the embodiment of FIGS. 6–10 or fixedly connected or mounted together in any other suitable manner. Radiused corner portions 295 may be defined between the ring 290 and the bushing portion 238 and between the ring 290 and the central portion 241.

The embodiment of FIGS. 6–10 also can be sold together in a container. For example, the housing 224, the pair of shafts 222, two pairs of bushings 218, and the pair of fasteners 270 and unitary proximal rings 271 may be sold in a container. Additionally, some of the components that need to be replaced on a frequent basis, such as the bushings 218 and the fasteners 270 and unitary proximal rings 271, may be sold together in a container, such as a bag or box, as a replacement kit. The pair of cotter pins 258 may also be included as part of the kit.

Figure 11:
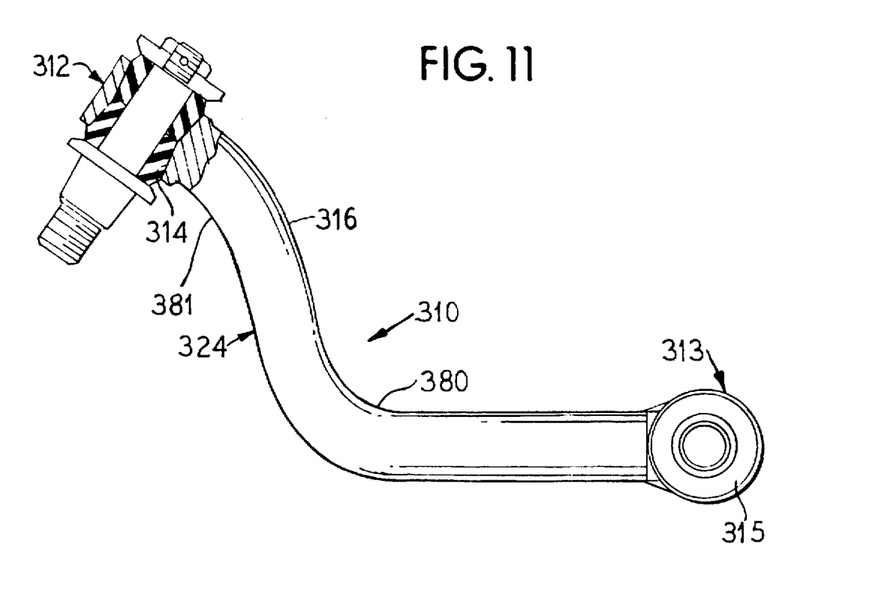
FIG. 11 is a plan view and partial cross section of the side of a stabilizer link in accordance with a further alternative embodiment of the invention.
Figure 12:
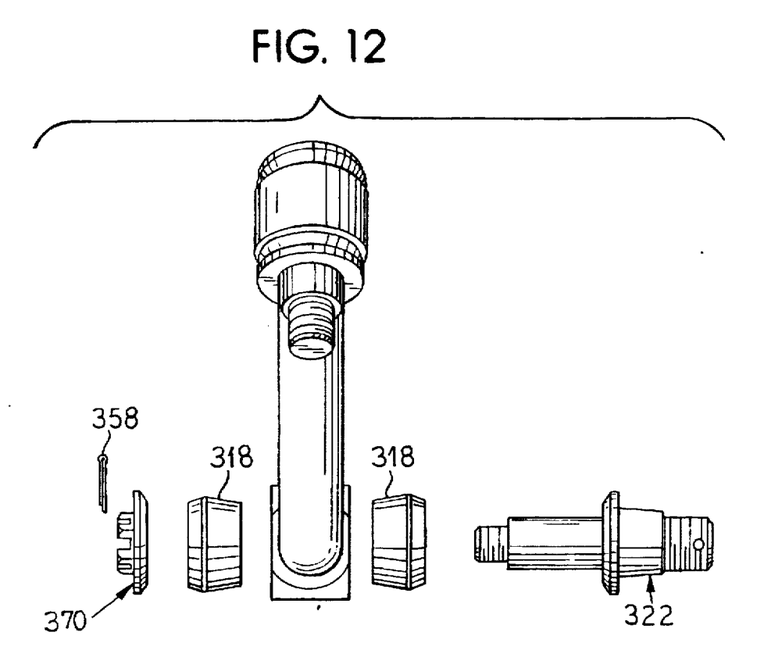
FIG. 12 is a plan and partial exploded view of the front of a stabilizer link similar to the link of FIG. 11.

FIGS. 11 and 12 illustrate still another alternative embodiment of the stabilizer link 310 wherein the housing 324 is of a design commonly referred to as "gooseneck" and the cylinders 312 and 313 are joined by the goosenecked stem 316 so that the axes of the pairs of bores 314 are substantially perpendicular. The shafts 322 are similar to those described in reference to the embodiment of FIGS. 6–10. This feature further facilitates quick and easy assembly of the stabilizer link 310 due to the unitary, and preferably integral design.

In this embodiment, cylinder 312 defines a pair of tapered bores 314 having an axis, while cylinder 313 defines a pair of tapered bores 315 also having an axis. Unlike previous embodiments, however, the two axes are in a spaced perpendicular relationship to each other, as shown in FIG. 12. With respect to stem 316, there are two curves 380 and 381 forming the gooseneck design.

Similar to the previous embodiments, the embodiment of FIGS. 11 and 12 may be sold together in a container. Frequently replaced components, such as bushings 318 and cotter pin 358 may be sold together in a replacement kit.

The foregoing description is for purposes of illustration only and is not intended to limit the scope of protection accorded this invention. The scope of protection is to be measured by the following claims, which should be interpreted as broadly as the inventive contribution permits.

What is claimed is:

1. A stabilizer link comprising:
   a) a cylinder defining a pair of contiguous bores opening in opposite directions, the pair of bores defining an axis;
   b) a stem associated with the cylinder for mounting the cylinder on a vehicle;
   c) a pair of bushings, each bushing received into a respective bore, each bushing defining a channel;
   d) a shaft received into the channels of the pair of bushings; and
   e) at least one fastening element for securing the shaft within the channels of the pair of bushings.

2. The stabilizer link of claim 1 wherein the fastening element comprises a distal retainer abutting a respective bushing.

3. The stabilizer link of claim 2 wherein the distal retainer and the shaft are unitary.

4. The stabilizer link of claim 3 wherein the distal retainer and the shaft are integral.

5. The stabilizer link of claim 2 wherein the distal retainer comprises a distal ring having a first flat surface that abuts the respective bushing and a circumferential flange angled with respect to the first flat surface.

6. The stabilizer link of claim 1 wherein the shaft includes a proximal end and the fastening element comprises a proximal retainer abutting a respective bushing and a fastener engaged with the proximal end.

7. The stabilizer link of claim 6 wherein the fastener and the proximal retainer are unitary.

8. The stabilizer link of claim 7 wherein the fastener and the proximal retainer are integral.

9. The stabilizer link of claim 6 wherein the fastener and the proximal end are threaded.

10. The stabilizer link of claim 6 wherein the proximal retainer comprises a proximal ring disposed about the shaft.

11. The stabilizer link of claim 6 wherein the proximal end of the shaft is threaded and wherein the fastener and the proximal retainer are unitary, and the fastener includes a plurality of parallel engaging fingers extending away from the respective bushing, the fingers having inwardly-facing threaded walls for engaging the threaded proximal end of the shaft.

12. The stabilizer link of claim 6 wherein the proximal retainer comprises a proximal ring having a second flat surface that abuts the respective bushing and a circumferential flange angled with respect to the second flat surface.

13. The stabilizer link of claim 1 wherein each bore tapers outward in a direction opposite its contiguous bore, each bushing being matingly received into its respective bore.

14. The stabilizer link of claim 13 wherein the bushings are tapered to complement the tapered bores defined by the cylinder.

15. The stabilizer link of claim 13 wherein each channel is substantially cylindrical along a length of its respective bushing and each bushing includes a pair of parallel flat ends and first and second frustoconical outer bushing walls with tapers that narrow toward the bushing flat ends, the first outer bushing wall extending along most of the length of the bushing and being matingly received by its respective bore, the second outer bushing wall extending at least partially beyond its respective bore, the flat ends of the bushings being substantially perpendicular to the axes of the bores.

16. The stabilizer link of claim 13 wherein the bushings are constructed of polyurethane with a hardness of about 85 to about 95 durometers.

17. The stabilizer link of claim 1 wherein the cylinder includes a tapered inner wall that defines the pair of tapered bores and a central ridge dividing the bores, the inner wall being configured to limit the axial movement of the bushings.

18. A stabilizer link comprising:
   a) a pair of hollow cylinders spaced apart from each other, each cylinder including a pair of open ends;
   b) a stem joining the cylinders;
   c) a pair of bushing configurations, each bushing configuration having two ends separated by a length and being received substantially within a respective cylinder, each bushing configuration defining a channel;
   d) two shafts, each shaft having a distal end and a proximal end and received into the channel of a respective bushing configuration;
   e) a pair of distal retainers, each distal retainer and a respective shaft being unitary and each distal retainer including a first portion facing one end of the respective bushing configuration;
   f) a pair of fasteners for securing the shafts within the channels of the respective bushing configurations; and
   g) a pair of proximal retainers, each proximal retainer and a respective fastener being unitary and each proximal retainer including a second portion facing the other end of the respective bushing configuration.

19. The stabilizer link of claim 18 wherein each distal retainer and the respective shaft are integral.

20. The stabilizer link of claim 18 wherein each proximal retainer and the respective fastener are integral.

21. The stabilizer link of claim 18 wherein the distal and proximal retainers are located outside the cylinders and channels.

22. The stabilizer link of claim 18 wherein the proximal ends of the shaft are threaded and wherein each fastener includes a threaded inner wall that defines a hole for receiving the threaded proximal end of the respective shaft and engages the threaded proximal end.

23. The stabilizer link of claim 18 wherein each distal retainer comprises a distal ring disposed about the respective shaft and each proximal retainer comprises a proximal ring disposed about the respective shaft.

24. The stabilizer link of claim 23 wherein each first and second portion includes a generally flat surface and a circumferential flange angled with respect to the flat surface, the flat surface of each distal ring facing the flat surface of a respective proximal ring with the circumferential flanges of respective distal and proximal rings extending away from each other.

25. The stabilizer link of claim 18 wherein each cylinder defines a pair of contiguous bores opening in opposite directions and each bushing configuration includes two bushings, each bushing received into a respective bore.

26. The stabilizer link of claim 25 wherein each bore tapers in a direction opposite its contiguous bore and the bushings are tapered to complement the tapered bores, and wherein each cylinder includes a tapered inner wall that defines one of the pairs of tapered bores and a central ridge dividing the bores, the tapered inner walls configured to limit the axial movement of the bushings.

27. A replacement kit for a stabilizer link that has a pair of cylinders, each cylinder defining a pair of contiguous tapered bores opening in opposite directions, each bore having an axis; a stem joining the cylinders; and two shafts, each received into a respective pair of bores; the kit comprising:

a) two pairs of bushings, each bushing configured to be matingly received into a respective bore, each bushing defining a generally cylindrical channel and the channels of each pair of bushings configured to receive a respective shaft;

b) a pair of fasteners for retaining the bushings within the bores, each fastener configured to engage the respective shaft to secure the respective shaft within a respective pair of channels;

c) a pair of retainers, each retainer configured to abut a respective bushing and being unitary with a respective fastener; and d) a container that retains the bushings, fasteners and retainers.

28. The replacement kit of claim 27 wherein each retainer is integral with the respective fastener.

29. The replacement kit of claim 27 wherein each retainer comprises a ring configured to be disposed about a respective shaft.

30. The replacement kit of claim 27 wherein each fastener includes a threaded inner wall that defines a hole for receiving a threaded end of the respective shaft to engage the threaded end.

31. The replacement kit of claim 30 further including a pair of cotter pins engageable with the fasteners for securing the fasteners to the threaded ends, the container also retaining the pair of cotter pins.

32. The replacement kit of claim 27 wherein each retainer includes a generally flat surface and a circumferential flange angled with respect to the flat surface.

33. The replacement kit of claim 32 wherein the circumferential flange of each retainer is configured to extend away from the respective bushing at an angle with respect to its flat surface of about 30 degrees.

34. The replacement kit of claim 27 wherein each fastener further includes a plurality of parallel engaging fingers extending from the respective retainer, the fingers having inwardly-facing threaded walls configured to engage a threaded proximal end of the respective shaft.

35. The replacement kit of claim 27 wherein the bushings are substantially the same in configuration and material.

36. The stabilizer link of claim 1 wherein each bushing has a pair of ends, and the fastening element includes a pair of washers disposed about the shaft and located outside of the bores and channels, each bushing being in abutting engagement with a respective washer.

37. The stabilizer link of claim 36 wherein each washer includes a flat portion and a circumferential flange angled with respect to the flat portion.

38. The stabilizer link of claim 36 wherein the shaft has a proximal threaded end, and the fastening element further includes a nut engageable with the proximal threaded end and being in abutting engagement with a respective washer.

39. The stabilizer link of claim 38 wherein a cotter pin hole is defined in the threaded end, and the nut is a castle nut; and wherein the fastening element further includes a cotter pin for securing the castle nut to the threaded end.

40. A replacement kit for a stabilizer link that has a cylinder defining a pair of contiguous tapered bores opening in opposite directions, each bore having an axis; a stem associated with the cylinder for mounting the cylinder on a vehicle; and a shaft received into the pair of bores; the kit comprising:

a pair of bushings, each bushing configured to be matingly received into one of the respective bores, each bushing defining a generally cylindrical channel, and the channels of the pair of bushings are configured to receive the shaft;

b) a fastener for retaining the bushings within the bores, the fastener configured to engage the shaft to secure the shaft within the channels;

c) a retainer configured to abut one of the respective bushings and being unitary with the fastener; and d) a container that retains the bushings, fastener, and retainer.

41. The replacement kit of claim 40 wherein the retainer is integral with the fastener.

42. The replacement kit of claim 40 wherein the retainer comprises a ring configured to be disposed about the shaft.

43. The replacement kit of claim 40 wherein the fastener includes a threaded inner wall that defines a hole for receiving a threaded end of the shaft to engage the threaded end.

44. The replacement kit of claim 43 further including a cotter pin engageable with the fastener for securing the fastener to the threaded end, the container also retaining the cotter pin.

45. The replacement kit of claim 40 wherein the retainer includes a generally flat surface and a circumferential flange angled with respect to the flat surface.

46. The replacement kit of claim 45 wherein the circumferential flange of the retainer is angled with respect to its flat surface about 30 degrees.

47. The replacement kit of claim 40 wherein the fastener further includes a plurality of parallel engaging fingers extending from the retainer, the fingers having inwardly-facing threaded walls configured to engage a threaded proximal end of the shaft.

48. The replacement kit of claim 40 wherein the bushings are substantially the same in configuration and material.

49. A method of assembling a stabilizer link for mounting to a vehicle comprising:

a) providing a cylinder defining a pair of contiguous bores opening in opposite directions, the pair of bores defining an axis;

b) inserting a pair of bushings into respective bores, each bushing defining a channel, the channels being substantially coaxial with the axis of the cylinder;

c) providing a shaft having a distal end and a proximal end;

d) providing a distal retainer adjacent to the distal end of the shaft;

e) sliding the shaft through the channels of the bushings so that the distal retainer abuts a respective bushing;

f) providing a proximal retainer at the proximal end of the shaft; and g) securing a fastening element to the proximal end of the shaft for retaining the shaft within the channels of the bushings.

50. The method of claim 49 including providing the shaft unitarily with the distal retainer.

51. The method of claim 49 including providing the proximal retainer unitarily with the fastening element.

* * * * *

UNITED STATES PATENT AND TRADEMARK OFFICE
CERTIFICATE OF CORRECTION

PATENT NO. : 5,794,965
DATED : August 18, 1998
INVENTOR(S) : Robert W. Stuker & Frederick Winkler It is certified that error appears in the above-indentified patent and that said Letters Patent is hereby corrected as shown below:

Column 9, line 7, --,fasteners 370-- should be inserted after "318".

Signed and Sealed this

Sixteenth Day of March, 1999

Attest:

Q. TODD DICKINSON

Attesting Officer

Acting Commissioner of Patents and Trademarks